US008734114B2

(12) United States Patent
McMillan

(10) Patent No.: US 8,734,114 B2
(45) Date of Patent: May 27, 2014

(54) BLADE FOR A GAS TURBINE ENGINE COMPRISING COMPOSITE MATERIAL HAVING VOIDS CONFIGURED TO ACT AS CRACK INITIATION POINTS WHEN SUBJECT TO DEFORMATION WAVE

(75) Inventor: Alison J. McMillan, Uttoxeter (GB)

(73) Assignee: Rolls-Royce PLC, London (GB)

( * ) Notice: Subject to any disclaimer, the term of this patent is extended or adjusted under 35 U.S.C. 154(b) by 979 days.

(21) Appl. No.: 12/155,376

(22) Filed: Jun. 3, 2008

(65) Prior Publication Data

US 2009/0035131 A1 Feb. 5, 2009

(30) Foreign Application Priority Data

Jun. 14, 2007 (GB) .................................. 0711492.9

(51) Int. Cl.
*F01D 9/02* (2006.01)
*F01D 5/14* (2006.01)
*B32B 5/02* (2006.01)

(52) U.S. Cl.
USPC .................. 416/229 R; 416/232; 416/241 R; 415/200

(58) Field of Classification Search
USPC .................. 415/200; 416/241 R, 229 R, 232
See application file for complete search history.

(56) References Cited

U.S. PATENT DOCUMENTS

| | | | |
|---|---|---|---|
| 3,967,996 A | | 7/1976 | Kamov et al. |
| 4,935,277 A | | 6/1990 | Le Balc'h |
| 5,129,787 A | | 7/1992 | Violette et al. |
| 5,375,978 A | | 12/1994 | Evans et al. |
| 5,584,660 A | * | 12/1996 | Carter et al. .................. 416/233 |
| 5,687,900 A | * | 11/1997 | Zaccone et al. ............ 228/173.6 |
| 2005/0076504 A1 | | 4/2005 | Morrison et al. |
| 2006/0275132 A1 | * | 12/2006 | McMillan .................... 416/224 |

FOREIGN PATENT DOCUMENTS

| | | |
|---|---|---|
| DE | 10 2004 057 979 A1 | 6/2006 |
| EP | 0 296 964 A1 | 12/1988 |
| GB | 2 216 606 A | 10/1989 |

* cited by examiner

*Primary Examiner* — Anh Mai
(74) *Attorney, Agent, or Firm* — Oliff PLC

(57) ABSTRACT

Blades for gas turbine engines which are formed from composite materials have problems with respect of resistance to impacts such as bird strikes. Previous blades formed from metals had some ductility towards the trailing edge which could accommodate the whiplash effects of impacts. With regard to composite materials such ductility is not present. By providing projections 32 which act as propagation wave trips as well as high intensity reflectors 36 it is possible to limit the whiplash at the edge 31 resulting in damage. Typically a cladding cap 38 is provided which also may be formed from a metal to allow some greater uniformity with respect to mass per length despite the tapering of the blade. Furthermore by providing voids which act as delamination initiation sites cracking can be provided between plies which allows greater flexibility towards the edge and therefore release of energy. These voids may incorporate uncured polymer matrix to act as a binder subsequent to delamination.

19 Claims, 2 Drawing Sheets

BLADE FOR A GAS TURBINE ENGINE COMPRISING COMPOSITE MATERIAL HAVING VOIDS CONFIGURED TO ACT AS CRACK INITIATION POINTS WHEN SUBJECT TO DEFORMATION WAVE

The present invention relates to composite components such as blades and more particularly blades for a gas turbine engine formed from composite materials.

Traditionally blades for gas turbine engines have been formed from metals such as titanium alloys. These metals have been designed and configured to withstand impacts from objects such as birds which may become incident upon the blades during operation. It is important that the blade set remains operational, to provide at least a 'get home' facility. Typically, blades may dint and disfigure such that they become subject to higher wear and tear and inevitably will have a reduced performance but nevertheless will remain operational for a sufficient time, as required by certification regulations. It will also be understood that within a gas turbine engine it is necessary that if there is any fragmentation that these fragmentations do not further damage the engine downstream.

Future generations of blades used in gas turbine engines may be formed from composite materials. These materials have advantages particularly with regard to weight but generally are more brittle and less ductile than prior metal alloys used to form blades. Composite materials generally cannot absorb strain energy through plastic deformation. A limitation for a composite fan blade is that a strike such as that with a bird leads to a whiplash motion at the trailing edge of the blade. Such whiplash motion is particularly destructive in composite blades as composite materials are more brittle and are subject to disintegration. A known solution to such problems is to reinforce the trailing edge such that it is substantially stiffer in order not to exceed the strain-to-failure limit, since for composites it is not possible to depend on plastic deformation as a means of controlling stress within the blade (as it would be with prior, more ductile, metal blades). Such reinforcement would lead to unacceptably thick trailing edges for aerodynamic reasons. A further approach would be to encase the trailing in substantial metal capping which then creates further problems with regard to weight balance within the blade as well as securing the metal capping to the trailing edge. It will also be appreciated one of the advantages of the use of composite materials is the ability to produce a lighter weight blade. Reinforcing the trailing edge or adding thick metal capping will negate such reduced weight benefits.

In accordance with aspects of the present invention there is provided a component for a gas turbine engine as set out in the claims.

Aspects of the present invention will now be described by way of example only with reference of the accompanying drawings in which:

FIG. 1 provides schematic illustrations of deformation propagation along a tapered element;

As indicated above a particular problem with regard to components such as blades is a deformation accentuating effect similar to whiplash travelling along the tapering aspect of a blade. To understand whiplash consider a long tapered string or element which is shaken at one end. A wave passes along the element from the thick end to the thin end. Due to the conservation of energy the wave amplitude becomes bigger as the string thins. The tip of the string moves so quickly that it is supersonic and this is what makes the characteristic cracking sound of the whiplash effect. As will be appreciated the forces on the tip are relatively destructive and can lead to end break off.

Figure 1:
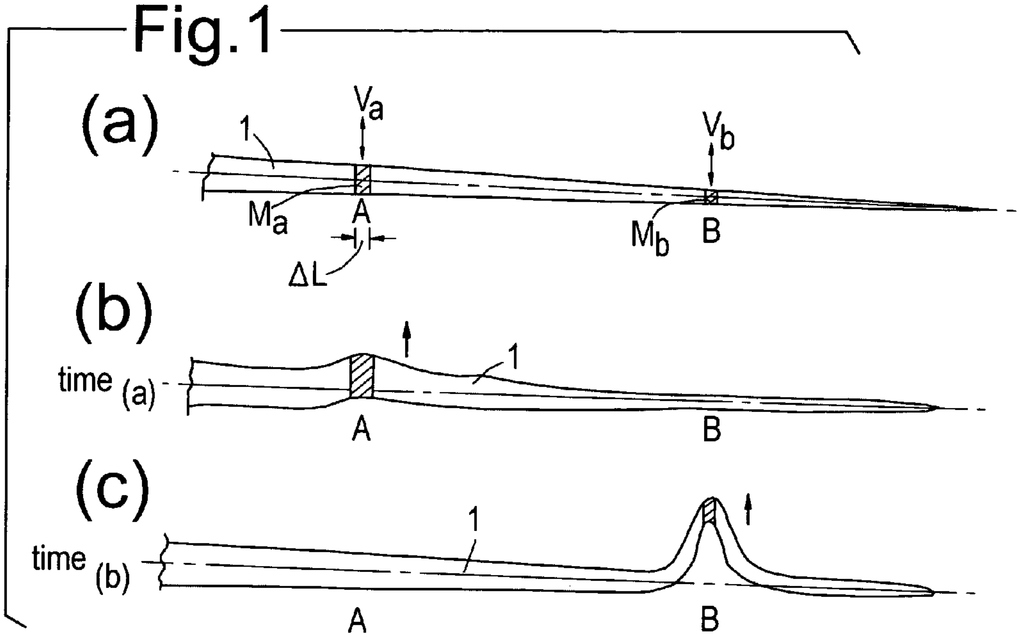

FIG. 1 provides schematic illustrations of the whiplash effect. A wave moves along a tapering element 1 at position A the kinetic energy is given by $\frac{1}{2} m_a \Delta L v_a^2$ where $m_a$ is the mass per unit length of the element 1 at position A. When the deformation wave pulse reaches position B the kinetic energy is a $\frac{1}{2} m_b \Delta L v_b^2$. In such circumstances for conservation of energy it will be appreciated the $v_b$ must be greater than $v_a$. In diagrammatical terms as shown in FIG. 1(*b*) in terms of the shaded regions where the section at A is more massive than at B. Conservation of energy demands that the pulse height at A is lower (FIG. 1(*b*)) than the pulse size at B (FIG. 1(*c*)).

It will also be appreciated that similar phenomena occur with regard to flags in terms of the ragged free edge. In flags the way to mitigate the effect is to attach some mesh to the free edge so that there is some weight against which to reflect the wave pulses. The free edge of the flag is then protected.

Figure 2:
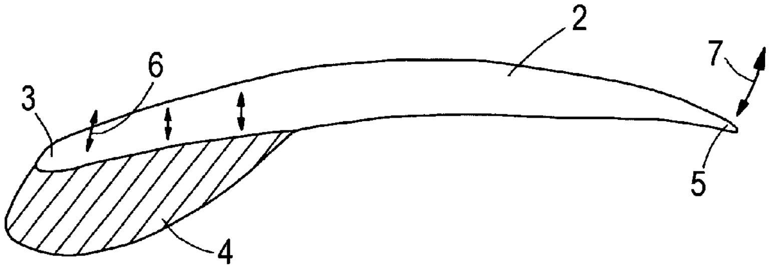
FIG. 2 is a schematic illustration of the effect of a bird strike upon a blade.

With regard to components such as blades used in gas turbine engines a similar effect happens under impacts. The effect is made worse by the fact that a bird impact is applied over a wide area of the leading edge such that a deformation pulse is propagated through the blade towards the trailing edge. FIG. 2 provides a schematic illustration showing the deformation in a blade 2 under a bird strike 4. The blade 2 is struck towards a leading edge 3 by the bird 4. This causes oscillations and deformations which are propagated along the blade 2 towards a trailing edge 5. The deformations in the blade 2 towards the leading edge 3 are shown by arrow heads 6 whilst the deformations towards the trailing edge 5 are illustrated by arrow heads 7. The deformations 7 are significantly greater than the deformations 6 causing disintegration towards the trailing edge 5.

Aspects of the present invention attempt to ameliorate the deformation response of a blade by one or both of deformation pulse wave reflection trips to create destructive interference to the deformation pulse wave so that the bulk of the deformation wave pulse does not transmit to the trailing edge andor protect the trailing edge by having a normally solid but electively delaminatable or disintegration edge in the form of a 'fluffy' expandable extension which provides for a aerodynamic efficiency.

In accordance with first and second aspects of the present invention projections andor reflectors are provided to inhibit deformation pulse propagation towards a trailing edge of a blade or tapering component. The projections act as wave reflection trips which work by reflecting the deformation pulse before it reaches the thinner end of the trailing edge. Ideally the reflection trips will have the effect of trapping the bulk of the deformation pulse as standing waves in the thicker parts of the blade. The pulse vibration and its energy will then dissipate through damping and some localised heating either as a result of some aerodynamic interactions or through built in damping material layers in the blade. To work as reflectors, the projections forming the trips need to create a static node. In such circumstance the trips comprise projections which are relatively more massive in terms of weight than the surrounding composite material or by achieving higher local stiffness mainly in the chordal direction. The use of a metal such as a titanium alloy may be sufficient to induce substantial reflection. The reflected wave pulse will be inverted so that by spacing the trip projections appropriately for the suspected wave length of the deformation pulse it will be understood that standing waves can be constructed which at least partially cancel each other out.

Figure 3:
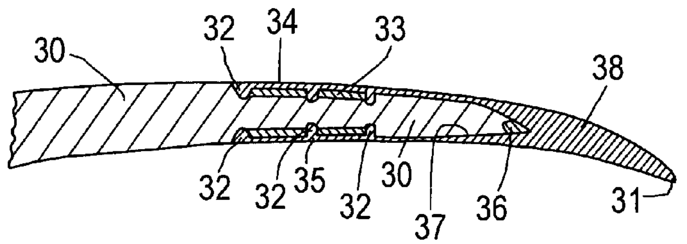
FIG. 3 is a schematic illustration of a cross section of a component edge in accordance with first and second aspects of the present invention.

FIG. 3 illustrates a blade 30 principally formed from a composite material extending towards an edge 31. In the blade 30 projections 32 are provided as local points of increased density and therefore act as reflection sites and trips to deformation wave propagation. In FIG. 3 three reflection trip projections are shown but in practice generally any number greater than one may be used although to be as effective as possible by create standing waves more than three would be preferably. The projection trips can be of different sizes to allow some waves to pass through to a trip and be cancelled by a trip projection pair beyond. As can be seen the projections 32 extend inwardly of the blade 30 towards each other. Generally, the projections 32 are arranged such that two projections 32 are opposite each other in a pair.

Between the projections 32 damping material 33 is provided to further inhibit deformation pulse propagation towards to the edge 31. As can be seen the projections 32 are located in surfaces 34, 35 which extend to define the edge 31. In the embodiment depicted in FIG. 3 these surfaces 34, 35 are provided by a cladding cap extending over the composite material 30 forming the blade 34. The cladding cap can be formed from any suitable material but will generally as indicated above be a metal such as a titanium alloy which in addition to allowing provision of the projections 32 to act as reflection trips also provides strengthening towards the edge 31 and may allow a more balanced weight distribution.

A further alternative in accordance with a second aspect of the present invention is to provide a relatively massive reflector 36 located within an internal discontinuity 37 of the blade 30. This discontinuity 37 in the embodiment depicted in FIG. 3 comprises a shaped discontinuity 37 between a cladding cap 38 forming the edge 31 and the composite material of the blade 30. Within the discontinuity 37 the reflector 36 is located. The discontinuity 37 effectively defines a big groove where the metal cladding cap 38 joins the remainder of the blade 30. The reflector 36 is formed from a material having a significantly greater mass than the composite material upon which the blade 30 is formed. By locating the reflector 36 at the position located and shown in FIG. 3 it is possible to protect the tip 31 where reducing mass per unit length of the composite material can not be compensated by increasing mass per unit length of the cap 38 for balance. As indicated previously, if the mass per unit length can be balanced or made more uniform along a tapering component, such as a blade, then by conservation of energy the deformation pulse height need not increase or increase as much. Normally, the massive reflector 36 as indicated has a higher density than the cap 38 and the composite material from which the blade 30 is formed. The reflector 36 is generally formed from Lead which has a higher density and is very ductile than composite materials. Alternatively, the reflector 36 could be formed from other metals and materials such as Hafnium which also has a high density and strength compared with composites such as carbon fibre reinforced plastics. The reflector 36 is positioned and shaped to reflect pulse energy into the composite material forming the bulk of the blade 30 below its elastic limit. As illustrated typically the reflector 36 will have an angular shape pointed towards the bulk of the blade 30.

By the first and second aspects of the present invention illustrated above with regard to FIG. 3 it will be appreciated that the tapering nature of the blade 30 can be adjusted through the cap cladding 38 such that there is a relatively constant mass per unit length by increasing the proportion of the taper due to the metal capping 38. However, particular advantages of aspects of the present invention are provisional of the projections 32 to provide reflection trips as well as a reflector 36 to limit deformation pulse propagation towards the edge 31.

A third aspect of the present invention relates to provision of delamination in the edge. This approach can be utilised independently or in conjunction with the first and second aspects of the invention described above. In principle the third aspect relates to deliberately allowing substantial matrix failure in the region of the trailing edge, under sufficient impact loads such as from a bird strike. This matrix failure and delamination will have two main effects—firstly, it will cause the trailing edge to become "fluffy" as it shakes itself into individual fibres or tows; and secondly, it will tend to cause loss of material from the trailing edge. In particular, the individual fibres or tows are much more flexible than the surrounding blade part, and will tend to shake off the blade altogether. In most instances the first and second aspects of the present invention described above will be sufficient to withstand impact but for higher level impacts a further approach may be required. As indicated above materials shed from the blade edge must not be moving with sufficiently higher velocity and must not be destructive to the rest of the engine or any more so than bits of a bird or potential impact object. In such circumstances it would be preferably if the material shed was frangible under prevailing conditions. The third aspect of the present invention utilises the propensity of composite materials to delaminate under certain conditions.

Figure 4:
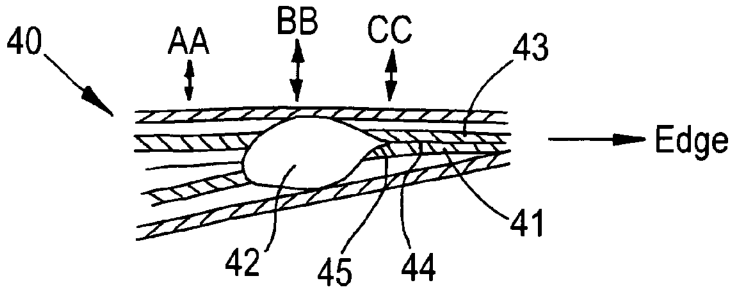
FIG. 4 is a schematic illustration of a cross section of a first embodiment of a third aspect of the present invention.

To achieve control of delamination aspects of the present invention provide cracking or delamination initiation points adjacent to the trailing edge of the blade. Generally these initiation points are tear shaped voids although other shapes may be used. Tear shaped voids have particular advantages in introducing points of lower strength and guidance for the delamination initiation at the point of the tear shape. The voids are pointed towards the trailing edge. In such circumstance as depict in FIG. 4 a deformation pulse first reaches point AA. There is a sudden drop in mass per unit length at point BB such that the wave force amplitude increases for conservation of energy reasons as described above. A tip point 45 of the void 42 is towards a section cc. The fact that there are fewer plies of composite material means the amplitude of the force at section CC is bigger than at section AA so that more of the pulse is transmitted rather than reflected and this is translated into delamination of the plies of the composite material. This will cause delamination along a crack line 41. In order to anchor and strengthen the blade 40 at portion AA the composite material may be stitched or tufted or z pinned for greater strength in comparison to portions BB, CC towards the trailing edge of the blade 40.

In such circumstance the tear shaped void 42 has to initiate a crack between plies 43, 44 along the crack line 41 when subject to a deformation pulse. In such circumstances a fuzzy edge will be created with greater flexibility and therefore the potential for accommodating the deformation pulse as described above.

Figure 5:
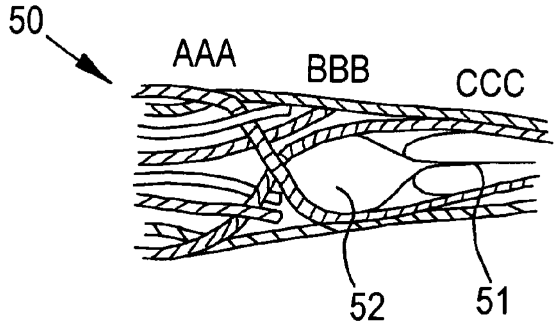
FIG. 5 is a schematic illustration of a second embodiment of the third aspect of the present invention; and, FIG. 6 is a schematic illustration of a third embodiment of the third aspect of the present invention.

FIG. 5 illustrates a similar principle with regard to a three dimensional structure weave composite structure in a blade 50. The principle of operation with a three dimensional weave composite structure is similar to the substantially planar ply structure depicted in FIG. 4. A three dimensional weave in a region AAA clearly has three dimensional aspects and includes a number of interlocking fibres for improved strength. The weave at portion BBB is far more like a laminate with no interlocking fibres and therefore less resistance to delamination. It will also be understood by providing internal cut fibres which run across the interlocking pairs in the three dimensional structure at region AAA there will be further improved resistance to delamination. In operation as previously a deformation pulse will travel through region AAA to region BBB where there is a step change in mass per unit length leading to increased deformation as described above. This step change is due to void 52. The increased deformation will result in delamination in the region CCC along a crack line 51 and therefore an ability to resist whiplash effects as described above. Delamination will allow the 'freed' laminates to flex move readily.

Under extreme bird strike or impact conditions as indicated preferential delamination takes place and the trailing edge shakes itself into individual plies or tows. Such individual plies or tows are clearly more flexible than the bulk of the blade and bits may shake off altogether.

The fibres or plies in sections CC or CCC may be coated to reduce their brittleness or allow controlled complete fracture of the fibre before the maximum amount of energy has been absorbed by the fibre and any inter fibre packing.

Although the strength and stiffness of the parts CC or CCC of the blade is lost the blade does retain some aerodynamic capability. As long as blade balance is not too badly affected the blade can still be operated under reduced thrust. This can allow time for fuel dumping and "go around" in extreme situations for a 'get home' facility.

One further approach is to provide within the voids acting as crack initiators a self healing fluid. In such circumstances a reservoir of uncured polymer matrix material can be carried in the blade. When delamination occurs this fluid will flow into the delamination between the plies. In such circumstances balance due to the material is lost on the blade but is matched by outward movement of the fluid. The fluid will bind up the composite material and cure so that the aerodynamic profile is not too compromised.

Figure 6:
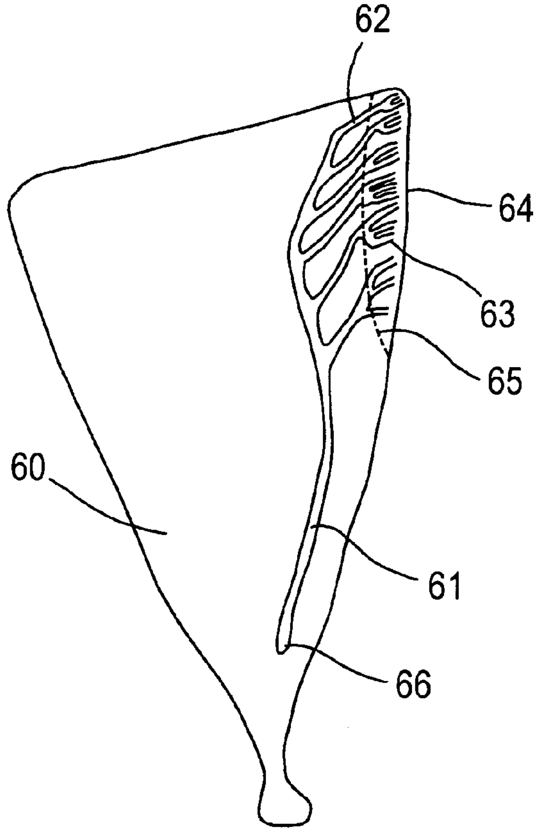

As indicated above the uncured polymer matrix may be located in the voids as described above with regard to FIGS. 4 and 5. Alternatively, as depicted in FIG. 6 a branch distribution network may be provided in which a blade 60 incorporates a primary void 61 which extends to branch voids 62, 63. The primary void 61 is an artery which extends substantially parallel to an edge 64 and in a thicker part of the blade 60. This means that the void 61 will have a minimal effect with regard to blade 60 stiffness. The branch voids 62, 63 will be located in particular parts of the blade where repair is more likely. Rupture of any of these branch voids 62, 63 will allow uncured polymer matrix to flow to repair the structure around that capillary branch void 62, 63. It will be appreciated that delamination is determined by the position of the delamination initiated by the voids 62, 63 as described above. Such delamination will typically occur close to the edge 64 and within a delamination area defined by a broken line 65. In such circumstance it will be appreciated that the amount of uncured polymer matrix required is limited as the area of potential delamination is also limited. Advantageously, the primary void 61 will incorporate a reservoir 66 at a position where the larger void necessity for the reservoir 66 will have limited effect upon blade 60 performance. Upon void fracture, and possibly under centrifugal or other driving pressures the uncured polymer matrix will flow through the artery void 61 and branch voids 62, 63 to the delamination area towards the edge 64. As indicated the amount of uncured polymer matrix required will be small and therefore blade balance will not be unduly affected.

The resin may be a two-phase material; that is to say, the curing of the resin is triggered by the mixing of two initially separate components or phases. In this case, the arrangement described above would need to be modified to provide the two separate components of the resin, and to mix them in the correct place and in the correct proportion. This may, for example, be achieved by the provision of two reservoirs and two corresponding systems of voids.

By aspects of the present invention, deformation wave pulses from an impact are controlled through use of a reflector system which limits propagation of the deformation waves into the tapered region towards the edge of the blade, by using reflectors to convert travelling deformation waves to standing waves and then damping these standing waves. Advantageously a specific wave reflector is provided in the form of a high local mass reflection point so that most of the vibration energy is reflected back rather than transmitted to the edge again to protect the tapered trailing edge section. Through use of metallic cladding caps with taper corresponding to the decreasing taper of the composite material blade section it is possible to achieve more uniformity with regard to mass per unit length or even increase that mass per unit length towards the edge. Finally, in accordance with aspects of the present invention, delamination is preferentially initiated defined by voids in the composite material. These voids will act as delamination initiators or starters and are typically tuned with a tear shaped cross section placed near to the blade edge susceptible to delamination. The point of the tear is towards the trailing edge to act as a guide and initiator with regard to delamination. In such circumstances wave energy is absorbed by the delamination process and possibly parts broken off and shed.

It is also possible that with regard to some aspects of the present invention to provide for a flow of uncured polymer matrix fluid into the delamination area. The fluid is allowed to flow upon rupture of the encapsulating laminations. The fluid is cured by exposure to air, mixing with a curing agent and also elevated temperatures in the blade due to high levels of vibration or with curing agent within the inter fibre filling that will be contacted by the emerging uncured polymer matrix.

It will also be appreciated that all aspects of the present invention as described above may be combined in order to provide protection within a component such as a blade formed from composite materials.

Although described with regard to blades it will be appreciated that aspects of the present invention will be utilised in other situations including rotating components as well as static components or to provide resistance to ballistic damage. In such components the edge to be protected is down stream of the impact site.

Modifications and alterations to aspects of the present invention will be appreciated by those skilled in the art. Thus, for example the projections and reflectors utilised with regard to the first and second aspects of the present invention may be of different lengths, materials and configuration to optimised reflection in use.

With regard to the uncured polymer matrix it will be appreciated that this matrix may be pressurised or comprise micro beads of material released upon delamination.

I claimed:

1. A component for a gas turbine engine, the component formed substantially of composite material and comprising surfaces extending to an edge, in which in use a deformation wave may be propagated through the component towards the edge, wherein the composite material has voids configured to act as crack initiation points when subject to a deformation wave, so that in use the edge delaminates from the voids when subjected to the deformation wave.

2. A component as claimed in claim 1, in which the component is a blade or vane.

3. A component as claimed in claim 1, in which the composite material comprises a substantially planar laminate assembly.

4. A component as claimed in claim 1, in which the composite material comprises a three dimensional weave.

5. A component as claimed in claim 1, in which the composite material includes through-thickness reinforcement in the form of stitching, tufting or pinning.

6. A component as claimed in claim 1, in which the voids are filled with uncured matrix for release upon delamination.

7. A component as claimed in claim 1, in which the voids form a branched network extending towards the edge.

8. A component as claimed in claim 7, in which the network has a primary void extending substantially parallel to the edge.

9. A component as claimed in claim 8, in which branch voids extend from the primary void towards the edge.

10. A component as claimed in claim 8, in which the primary void provides a reservoir filled with uncured matrix for release from the primary void upon delamination.

11. A component as claimed in claim 7, in which the network has a pair of primary voids extending substantially parallel to the edge.

12. A component as claimed in claim 11, in which branch voids extend from each of the primary voids towards the edge.

13. A component as claimed in claim 11, in which each primary void provides a reservoir and each reservoir is filled with one component of the uncured matrix for release from the primary voids upon delamination.

14. A component as claimed in claim 1, in which the voids are adjacent to the edge of the component.

15. A component as claimed in claim 14, in which the voids are tear shaped.

16. A component as claimed in claim 15, in which the voids are pointed towards the edge.

17. A component as claimed in claim 1, in which the composite material includes carbon fiber reinforced plastic.

18. A component as claimed in claim 1, in which the voids are configured to initiate a crack between plies of the composite material along a crack line when subject to the deformation wave.

19. A component as claimed in claim 18, in which the delamination allows the edge to become temporarily more flexible in order to dissipate energy of the deformation wave.

* * * * *